(12) United States Patent
Shen et al.

(10) Patent No.: US 8,045,088 B2
(45) Date of Patent: Oct. 25, 2011

(54) LIQUID CRYSTAL DISPLAY DEVICE HAVING METAL SHIELD WITH FIXING UNIT AND SHIELDING UNIT

(75) Inventors: Rui-Ye Shen, Shenzhen (CN); Te-Hsu Wang, Miao-Li (TW); Su-Sheng Mong, Miao-Li (TW)

(73) Assignees: Innocom Technology (Shenzhen) Co., Ltd., Shenzhen, Guangdong Province (CN); Chimei Innolux Corporation, Miao-Li County (TW)

( * ) Notice: Subject to any disclaimer, the term of this patent is extended or adjusted under 35 U.S.C. 154(b) by 783 days.

(21) Appl. No.: 12/150,271

(22) Filed: Apr. 25, 2008

(65) Prior Publication Data
US 2008/0266485 A1    Oct. 30, 2008

(30) Foreign Application Priority Data
Apr. 25, 2007    (CN) .......................... 2007 1 0074216

(51) Int. Cl.
*G02F 1/13*    (2006.01)

(52) U.S. Cl. ......................... 349/58; 248/201; 248/298.1

(58) Field of Classification Search ................... 248/201, 248/298.1; 349/58
See application file for complete search history.

(56) References Cited

U.S. PATENT DOCUMENTS

| 6,615,525 | B1 | 9/2003 | Chang | |
|---|---|---|---|---|
| 2006/0203438 | A1 | 9/2006 | Chiu et al. | |
| 2008/0266485 | A1* | 10/2008 | Shen et al. | 349/59 |

FOREIGN PATENT DOCUMENTS

| CN | 2307381 Y | 2/1999 |
|---|---|---|
| CN | 2401913 Y | 10/2000 |
| JP | 3117923 U | 1/2006 |

* cited by examiner

*Primary Examiner* — Phu Vu
(74) *Attorney, Agent, or Firm* — Altis Law Group, Inc.

(57) ABSTRACT

An exemplary liquid crystal display device (20) includes a rear frame (25) including a plurality of first through holes (251) and a shield (24) including a back frame (241). The back frame includes a plurality of second through holes (244) corresponding to the first through holes, respectively. The back frame further includes a plurality of fixing units (245), and the shield further includes a plurality of shielding units (240) corresponding to the fixing units respectively. Each of the shielding units is fixed to a corresponding one of the fixing units by insert directly into the fixing unit.

20 Claims, 7 Drawing Sheets

LIQUID CRYSTAL DISPLAY DEVICE HAVING METAL SHIELD WITH FIXING UNIT AND SHIELDING UNIT

FIELD OF THE INVENTION

The present invention relates to liquid crystal display (LCD) devices, and more particularly to an LCD device having a metal shield with a fixing unit and a shielding unit, the fixing unit being used to fix the shielding unit.

GENERAL BACKGROUND

A typical LCD device has the advantages of portability, low power consumption, and low radiation, and has been widely used in various portable information products such as notebooks, personal digital assistants (PDAs), video cameras, and the like. The LCD device includes a frame, and the frame may be hung on the wall or supported on the top of a table.

Referring to FIG. 8, an exploded, isometric view of a typical LCD device is shown. The LCD device 10 includes a front frame 11, a display module 12, a printed circuit board (PCB) 13, a metal shield 14, and a rear frame 15 arranged in that order from left to right. The metal shield 14 is used for shielding electro magnetic interference (EMI). The display module 12, the PCB 13, and the metal shield 14 are secured between the front frame 11 and the rear frame 15. The rear frame 15 includes a plurality of first through holes 151.

Referring also to FIG. 9, an enlarged, isometric view of the metal shield 14 is shown. The metal shield 14 includes a back frame 141 and a plurality of rivets 140. The back frame 141 includes a bottom plate 142, and a plurality of side walls 143 perpendicularly extending from edges of the bottom plate 142. The bottom plate 142 and the side walls 143 cooperatively form an accommodating space to accommodate the PCB 13. The bottom plate 142 includes a plurality of second through holes 144 corresponding to the first through holes 151, respectively. The rivets 140 correspond to the second through holes 144 respectively, and are used to close up the metal shield 14 and the rear frame 15 via the first and second through holes 151, 144.

Each rivet 140 has a cylinder structure with an opening (not shown), and a thread (not shown) is disposed on an inner surface of the rivet 140 to enable the rivet 140 to function as a nut. The rivets 140 are further used for sealing the second through holes 144, so as to prevent conductive media such as iron dust from entering the PCB 13. When the LCD device 10 needs to be hung on a wall, the rivets 140 are also used to fit corresponding bolts to fix the LCD device 10 to a wall hanging device on the wall.

Referring to FIG. 10, an assembled view of the LCD device 10 is shown. When the LCD device 10 has been assembled, the PCB 13 is accommodated in the accommodating space of the metal shield 14. The front frame 11 and the rear frame 15 secure the display module 12, the PCB 13, and the metal shield 14. The openings of the rivets 140 correspond to the first through holes 151, respectively.

However, during the assembling process, the rivets 140 need to be placed in the second through holes 144 manually, and then be fixed to the bottom plate 142 by a machine. Thus the assembling process of the LCD device 10 is unduly complicated and inefficient.

What is needed, therefore, is a LCD device that can overcome the above-described deficiencies.

SUMMARY

An exemplary liquid crystal display device includes a rear frame including a plurality of first through holes and a shield including a back frame. The back frame includes a plurality of second through holes corresponding to the first through holes, respectively. The back frame further includes a plurality of fixing units, and the shield further includes a plurality of shielding units corresponding to the fixing units respectively. Each of the shielding units is fixed to a corresponding one of the fixing units by insert directly into the fixing unit.

Another exemplary liquid crystal display device includes a rear frame including a plurality of first through holes and a shield including a back frame. The back frame includes a plurality of second through holes corresponding to the first through holes, respectively. The back frame further includes a plurality of fixing units, and the shield further includes a plurality of shielding units corresponding to the fixing units respectively. Each of the fixing units includes two guiding grooves and an elastic trip cooperatively to fix a corresponding one of the shielding units.

Other novel features and advantages will become more apparent from the following detailed description when taken in conjunction with the accompanying drawings. In the drawings, all the views are schematic.

DETAILED DESCRIPTION OF PREFERRED EMBODIMENTS

Reference will now be made to the drawings to describe preferred and exemplary embodiments of the present invention in detail.

Figure 1:
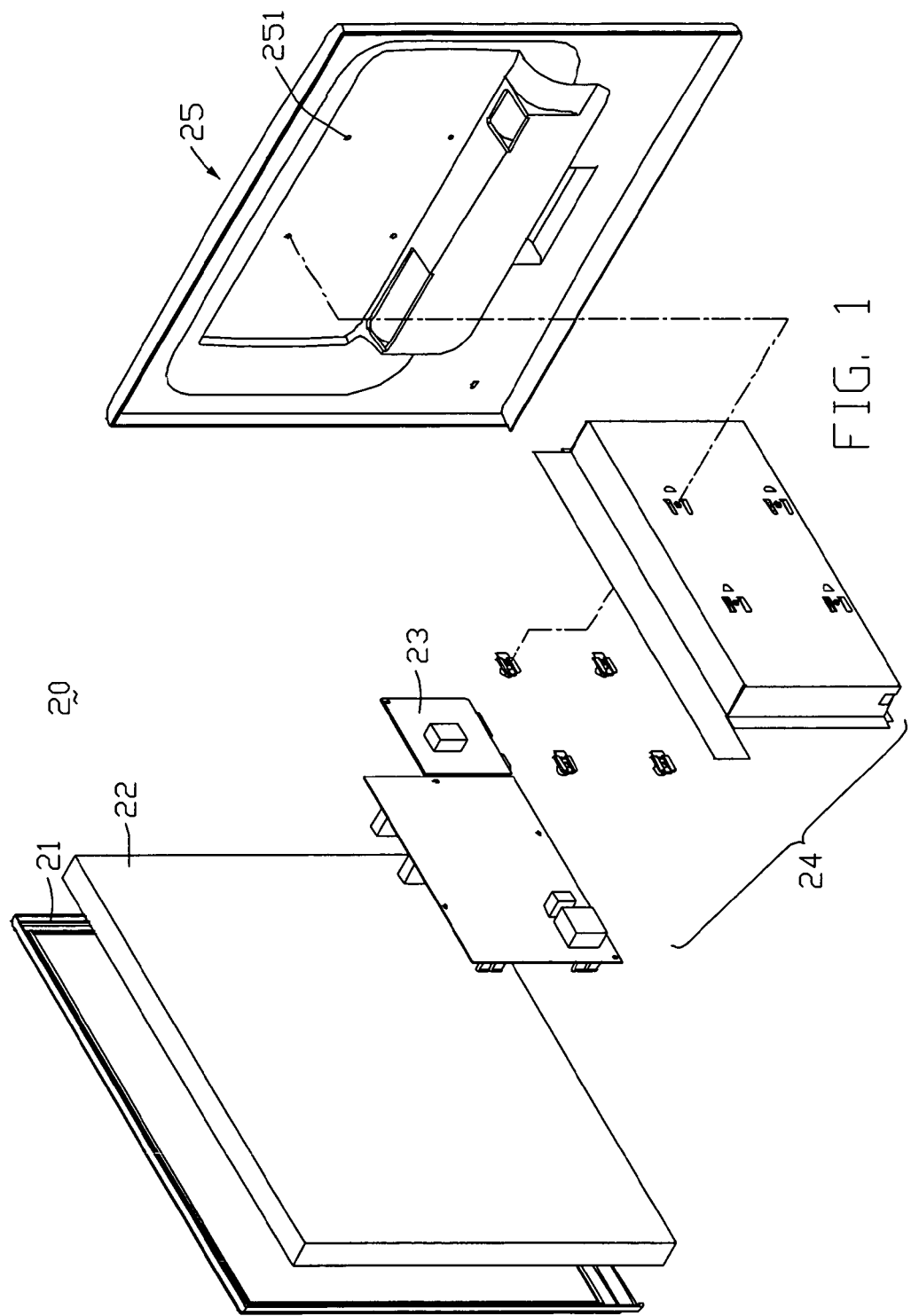
FIG. 1 is an exploded, isometric view of an LCD device according to an exemplary embodiment of the present invention, the LCD device including a metal shield.

Referring to FIG. 1, an exploded, isometric view of an LCD device according to an exemplary embodiment of the present invention is shown. The LCD device 20 includes a front frame 21, a display module 22, a PCB 23, a metal shield 24, and a rear frame 25 arranged in that order from left to right. The front frame 21 and the rear frame 25 can cooperate to secure the display module 22, the PCB 23, and the metal shield 24 therebetween. The rear frame 25 includes a plurality of first through holes 251.

Figure 2:
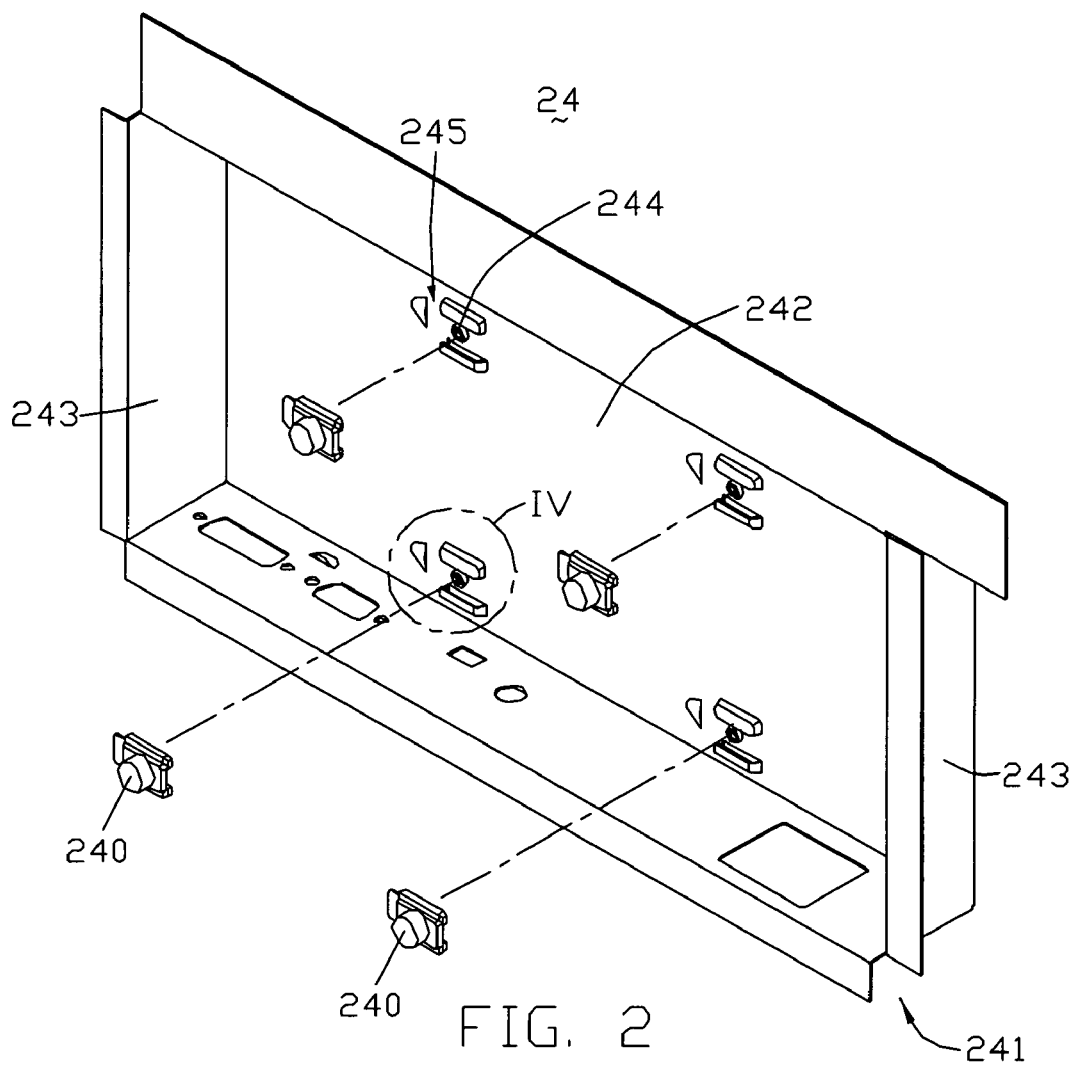
FIG. 2 is an enlarged, isometric view of the metal shield of the LCD device of FIG. 1, the metal shield including a plurality of shielding units.

Referring also to FIG. 2, an enlarged, isometric view of the metal shield 24 is shown. The metal shield 24 is preferably made of iron, and therefore can reduce or even eliminate EMI. The metal shield 24 includes a back frame 241 and a plurality of shielding units 240. The shielding units 240 are made of insulating and fireproofing materials. The back frame 241 includes a bottom plate 242, and a plurality of side walls 243 perpendicularly extending from edges of the bottom plate 242. The bottom plate 242 and the side walls 243 cooperatively form an accommodating space to accommodate the PCB 23. The bottom plate 242 includes a plurality of fixing units 245 and a plurality of second through holes 244 corresponding to the first through holes 251. The shielding units 240 correspond to the fixing units 245, respectively. Each fixing unit 245 is used to fix the corresponding shielding unit 240, so as to prevent conductive media such as iron dust from entering the PCB 23 via the corresponding second through hole 244. The second through holes 244 may be formed by stamping the bottom plate 242. A thread (not labeled) is disposed on an inner surface of each second through hole 244 to enable the second through hole 244 to function as a nut. When the LCD device 20 needs to be hung on a wall, the second through holes 244 are used to fit corresponding bolts to fix the LCD device 20 to a wall hanging device on the wall.

Figure 3:
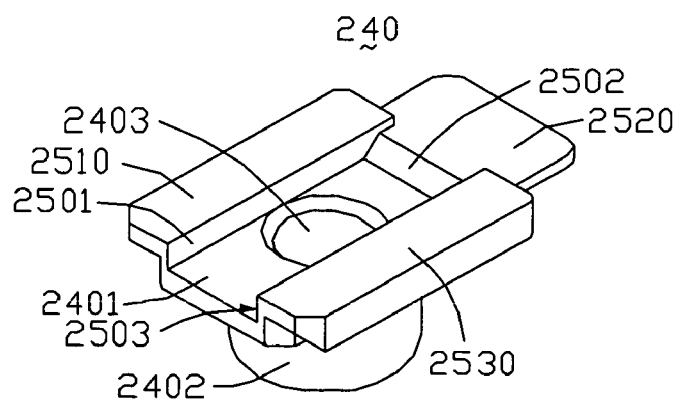
FIG. 3 is an enlarged, isometric view of one of the shielding units of the metal shield of FIG. 2.

Referring also to FIG. 3, an enlarged, isometric view of one of the shielding units 240 is shown. The shielding unit 240 includes a main body 2401 having a rectangular shape, a first side wall 2501, a second side wall 2502, and a third side wall 2503. The three side walls 2501, 2502, and 2503 are connected successively. The first and third side walls 2501, 2503 perpendicularly extend from two opposite edges of the main body 2401, respectively. The second side wall 2502 slantingly extends outwards from another edge between the two opposite edges of the main body 2401. A first slide arm 2510 perpendicularly extends outwards from a top edge of the first side wall 2501, and a second slide arm 2530 perpendicularly extends outwards from a top edge of the third side wall 2503. A stop arm 2520 extends outwards from a top edge of the second side wall 2502. The first and second slide arms 2510, 2530, and the stop arm 2520 are parallel to the main body 2401. The shielding unit 240 further includes a protrusion 2402 having a columniform shape, and a blind hole 2403 disposed through the main body 2401 and extending through to the protrusion 2402. The protrusion 2402 is disposed at a center of the main body 2401 and disposed opposite to the three side walls 2501, 2502, and 2503.

Figure 4:
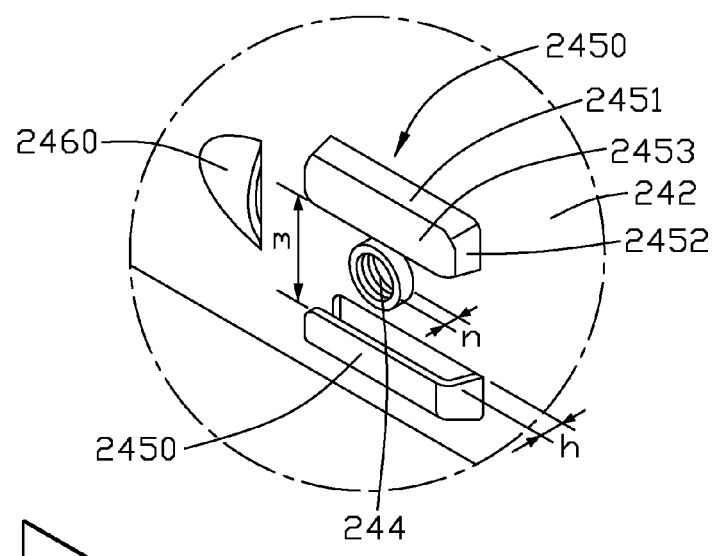
FIG. 4 is an enlarged, isometric view of a circled portion IV of FIG. 2.

Referring also to FIG. 4, an enlarged, isometric view of a circled portion IV of FIG. 2 is shown. The fixing unit 245 includes two guiding grooves 2450 and an elastic trip 2460, which cooperate to fix one corresponding shielding unit 240. Each guiding groove 2450 includes an L-shaped slide wall (not labeled) inwardly extending perpendicularly from the bottom plate 242 and an extension portion 2453. The extension portion 2453 extends from a top edge (not labeled) of the L-shaped slide wall, and is parallel to the bottom plate 242. The L-shaped slide wall includes a main portion 2451 and a bent portion 2452. The bent portion 2452 is connected to an end (not labeled) of the main portion 2451 and perpendicular to the main portion 2451. The two guiding grooves 2450 are parallel and face to face. The elastic trip 2460 is disposed near another end (not labeled) of the main portion 2451. The two guiding grooves 2450 and the elastic trip 2460 surround one corresponding second through hole 244.

A gap m between the two guiding grooves 2450 is approximately equal to a width of the main body 2401 of the shielding unit 240. A vertical distance h between the extension portion 2453 and the bottom plate 242 is approximately equal to a thickness of the first slide arm 2510. A height n of the second through hole 244 from the bottom plate 242 is equal to or less than a sum of a height of the first side wall 2501 and a thickness of the main body 2401.

Figure 5:
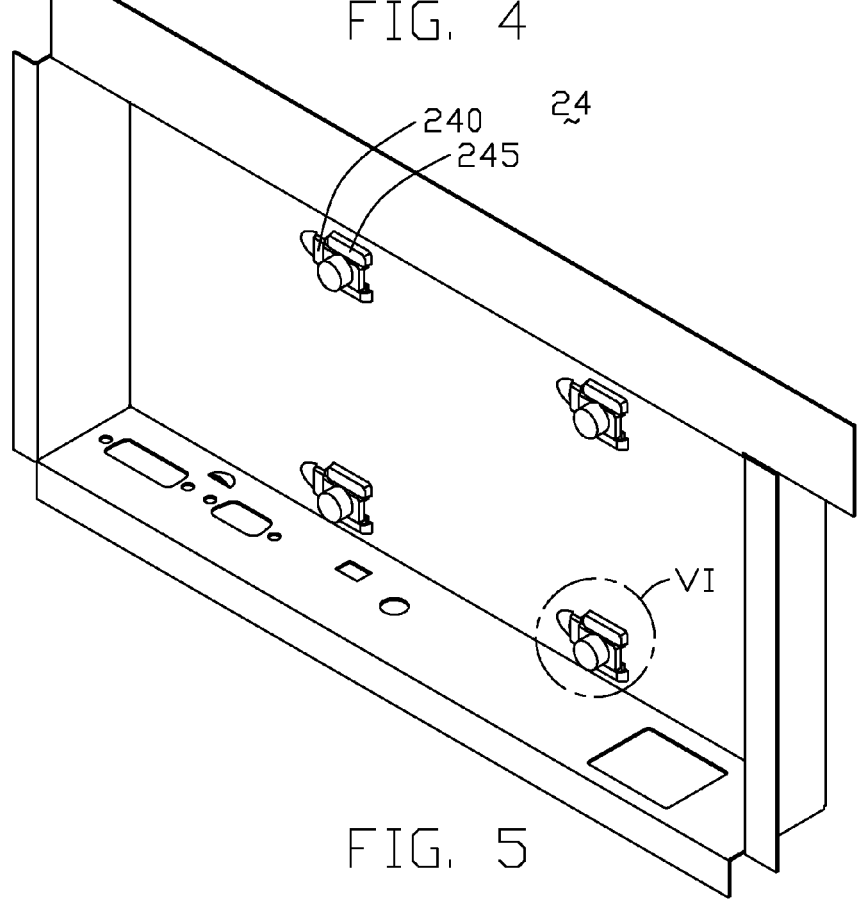
FIG. 5 is an assembled view of the metal shield of FIG. 2.
Figure 6:
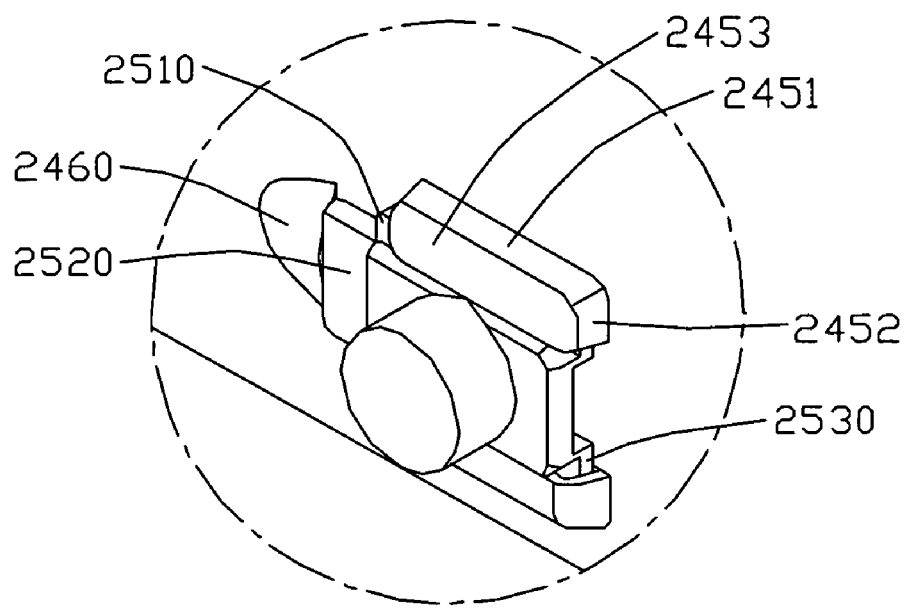
FIG. 6 is an enlarged, isometric view of a circled portion VI of FIG. 5.

Referring to FIGS. 5-6, when the metal shield 24 is assembled, each shielding unit 240 presses the elastic trip 2460 of one corresponding fixing unit 245, the first and second slide arms 2510, 2530 of the shielding unit 240 are slid into the two guiding grooves 2450 of the fixing unit 245 and abut against the bent portions 2452, respectively. After that, the elastic trip 2460 rebounds, and the stop arm 2520 abuts against the elastic trip 2460 of the fixing unit 245. Thus the shielding units 240 are fixed to the fixing units 245 respectively, and the blind hole 2403 of each shielding unit 240 is aligned with one corresponding second through hole 244 of the bottom plate 242.

Figure 7:
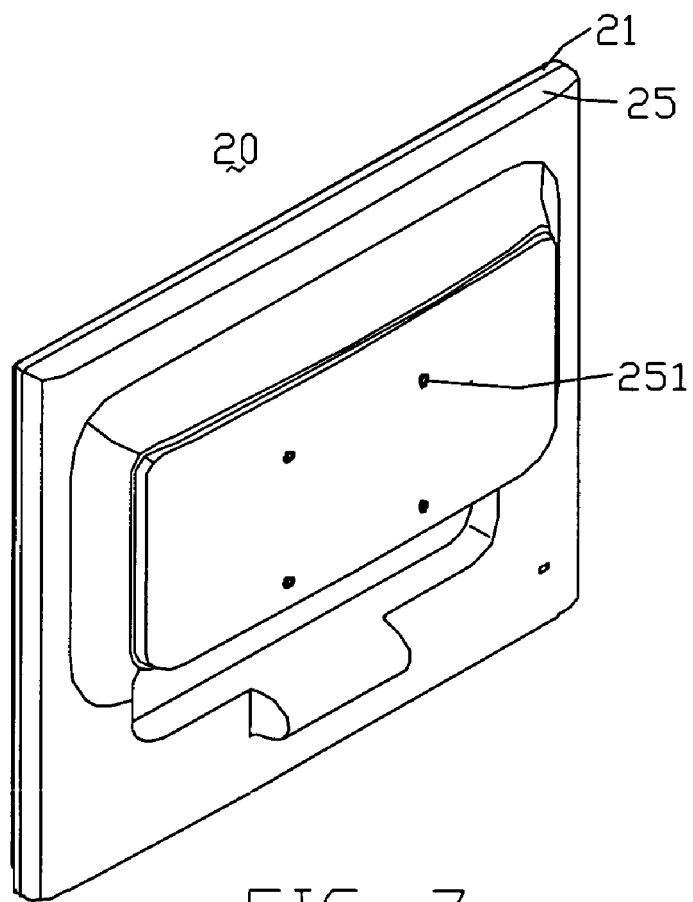
FIG. 7 is an assembled view of the LCD device of FIG. 1.
Figure 8:
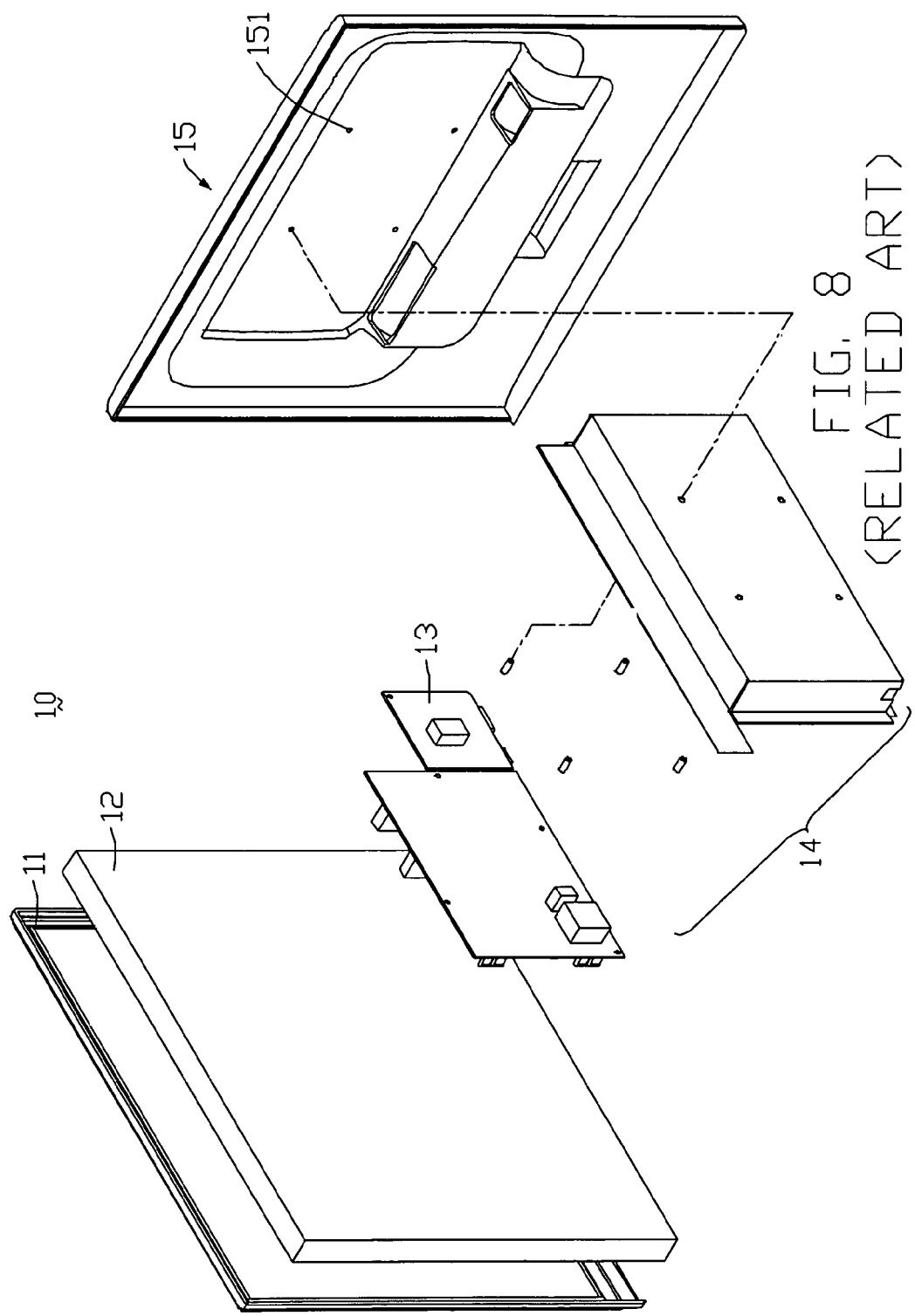
FIG. 8 is an exploded, isometric view of a conventional LCD device, the LCD device including a metal shield.
Figure 9:
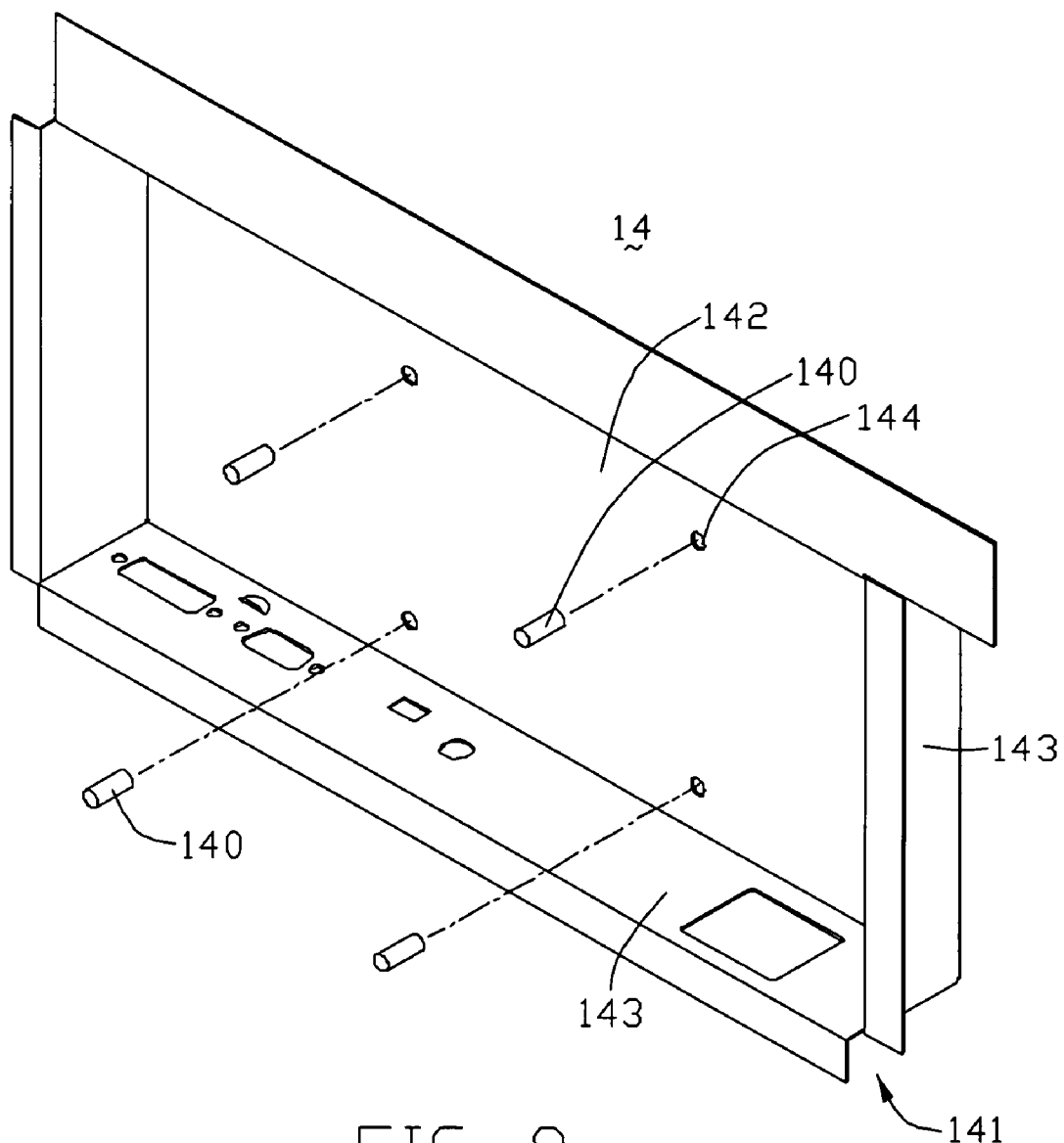
FIG. 9 is an enlarged, isometric view of the metal shield of the LCD device of FIG. 8.
Figure 10:
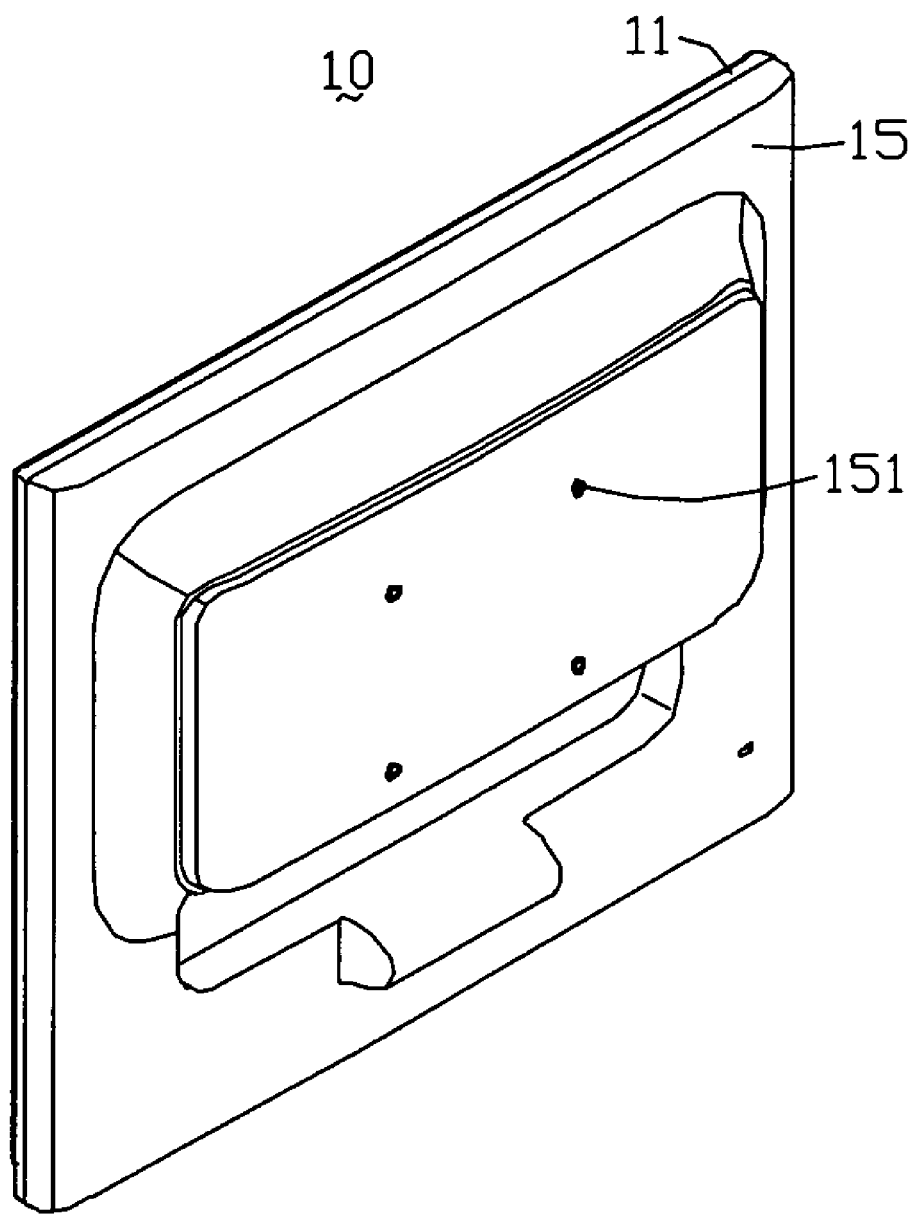
FIG. 10 is an assembled view of the LCD device of FIG. 8.

Referring to FIG. 7, an assembled view of the LCD device 20 is shown. When the LCD device 20 has been assembled, the PCB 23 is accommodated in the accommodating space of the metal shield 24. The front frame 21 and the rear frame 25 secure the display module 22, the PCB 23, and the metal shield 24. The second through holes 244 correspond to the first through holes 251 of the rear frame 25, respectively.

In the assembling process of the LCD device 20, the shielding unit 240 can be directly insert into the fixing unit 245 to be fixed, and cooperatively with the fixing unit 245 to seal the second through hole 244. Thus the assembling process of the LCD device 20 is simplified and efficient.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A liquid crystal display device, comprising:
   a front frame;
   a rear frame comprising a plurality of first through holes, the rear frame cooperating with the front frame to form an accommodating space;
   a display module accommodated in the accommodating space;
   a shield accommodated in the accommodating space and disposed between the display module and the rear frame, the shield comprising a back frame, the back frame comprising a plurality of second through holes corresponding to the first through holes, respectively, and a plurality of fixing units adjacent to the plurality of second through holes, respectively; and
   a plurality of shielding units attached to the fixing units, respectively;
   wherein each of the fixing units comprises a guiding groove with an extending direction substantially parallel to the back frame, and each of the shielding units is inserted into the guiding groove of a corresponding one of the fixing units, slides along the extending direction of the guiding groove, and is fixed to the back frame and covers a corresponding one of the plurality of second through holes and a corresponding one of the plurality of first through holes.

2. The liquid crystal display device of claim 1, wherein the shielding units are configured for sealing the second through holes and preventing conductive media entering the accommodating space via the first and second through holes, respectively.

3. The liquid crystal display device of claim 2, wherein each of the fixing units further comprises an elastic trip and another guiding groove, the two guiding grooves and the elastic trip are located at three sides of a corresponding one of the second through holes, and the two guiding grooves are parallel and face to face.

4. The liquid crystal display device of claim 3, wherein the back frame comprises a bottom plate and a plurality of side walls perpendicularly extending from edges of the bottom plate, the bottom plate and the side walls cooperatively form another accommodating space to accommodate a printed circuit board (PCB) of the display module, and the second through holes are disposed through the bottom plate.

5. The liquid crystal display device of claim 4, wherein each of the guiding grooves comprises an L-shaped slide wall inwardly extending perpendicularly from the bottom plate and an extension portion, and the extension portion extends from a top edge of the L-shaped slide wall and is parallel to the bottom plate.

6. The liquid crystal display device of claim 5, wherein the L-shaped slide wall comprises a main portion and a bent portion, and the bent portion is connected to an end of the main portion and perpendicular to the main portion.

7. The liquid crystal display device of claim 6, wherein each of the shielding units comprises a main body having a rectangular shape, a first side wall, a second side wall, and a third side wall, the three side walls are connected successively, the first and third side walls perpendicularly extend from two opposite edges of the main body respectively, and the second side wall slantingly extends outwards from another edge of the main body between the two opposite edges of the main body.

8. The liquid crystal display device of claim 7, wherein each of the shielding units further comprises a first slide arm, a second slide arm, and a stop arm, the first slide arm perpendicularly extends outwards from a top edge of the first side wall, the second slide arm perpendicularly extends outwards from a top edge of the third side wall, the stop arm extends outwards from a top edge of the second side wall, and the first and second slide arms and the stop arm are parallel to the main body.

9. The liquid crystal display device of claim 8, wherein each of the shielding units further comprises a protrusion having a columniform shape and a blind hole disposed through the main body and extending through to the protrusion, and the protrusion is disposed at a center of the main body and disposed opposite to the three side walls.

10. The liquid crystal display device of claim 9, wherein a gap between the two guiding grooves is equal to a width of the main body, a vertical distance between the extension portion and the bottom plate is equal to a thickness of the first slide arm, and a height of the second through hole from the bottom plate is equal to or less than a sum of a height of the first slide arm and a thickness of the main body.

11. The liquid crystal display device of claim 10, wherein when the shield is assembled, each shielding unit presses the elastic trip of one corresponding fixing unit, and the first and second slide arms of the shielding unit are slid into the two guiding grooves of the fixing unit and abut against the bent portions, respectively, and after that, the elastic trip rebounds, the stop arm abuts against the elastic trip of the fixing unit, and the blind hole of the shielding unit is aligned with one corresponding second through hole of the bottom plate.

12. The liquid crystal display device of claim 1, wherein the shielding units are made of insulating and fireproofing materials.

13. The liquid crystal display device of claim 12, wherein each of the second through holes comprises a thread on an inner surface thereof.

14. The liquid crystal display device of claim 13, wherein the second through holes are configured for fitting corresponding bolts to hold the liquid crystal display device to a wall hanging device on a wall.

15. A liquid crystal display device, comprising:
a rear frame comprising a plurality of first through holes; and
a shield comprising a back frame, the back frame comprising a plurality of second through holes corresponding to the first through holes, respectively;
wherein the back frame further comprises a plurality of fixing units, the shield further comprises a plurality of shielding units corresponding to the fixing units respectively, each of the fixing units comprises two guiding grooves and an elastic trip, the two guiding grooves and the elastic trip of each of the fixing units substantially surround three sides of a corresponding one of the second through holes, and each of the shielding units is attached to the back frame and shields the corresponding second through hole by engaging in the two guiding grooves and engaging with the elastic trip of a corresponding one of the shielding units.

16. The liquid crystal display device of claim 15, wherein the shielding units are configured for sealing the second through holes, respectively.

17. The liquid crystal display device of claim 16, wherein each of the second through holes comprises a thread on an inner surface thereof, and the second through holes are configured for fitting corresponding bolts to hold the liquid crystal display device to a wall hanging device on a wall.

18. The liquid crystal display device of claim 17, wherein each of the shielding units comprises a main body having a rectangular shape, a first L-shaped side wall, a second L-shaped side wall, and a third L-shaped side wall, the three L-shaped side walls are connected successively, the first and third L-shaped side walls perpendicularly extend from two opposite edges of the main body respectively, and the second L-shaped side wall slantingly extends outwards from another edge of the main body between the two opposite edges of the main body.

19. The liquid crystal display device of claim 18, wherein each of the shielding units further comprises a protrusion having a columniform shape and a blind hole disposed through the main body and extending through to the protrusion, and the protrusion is disposed at a center of the main body opposite to the three L-shaped side walls.

20. The liquid crystal display device of claim 19, wherein when the shield is assembled, each shielding unit presses the elastic trip of one corresponding fixing unit, the first and third L-shaped side walls are slid into the two guiding grooves of the fixing unit, the second L-shaped side wall abuts against the elastic trip of the fixing unit, the blind hole of the shielding unit is aligned with one corresponding second through hole of the bottom plate, and the protrusion seals the second through hole.

* * * * *